United States Patent
Krenkel et al.

(10) Patent No.: US 6,833,163 B1
(45) Date of Patent: Dec. 21, 2004

(54) CALIBRATING BODY

(75) Inventors: Walter Krenkel, Renningen (DE); Ralph Renz, Sindelfingen (DE); Bodo Benitsch, Stuttgart-Rohr (DE)

(73) Assignee: Deutsches Zentrum fuer Luft-und Raumfahrt E.V., Bonn (DE)

( * ) Notice: Subject to any disclaimer, the term of this patent is extended or adjusted under 35 U.S.C. 154(b) by 0 days.

(21) Appl. No.: 10/625,043

(22) Filed: Jul. 23, 2003

Related U.S. Application Data

(62) Division of application No. 09/769,172, filed on Jan. 25, 2001, now abandoned.

(30) Foreign Application Priority Data

Jan. 25, 2000 (DE) .......................................... 100 03 176

(51) Int. Cl.⁷ ............................................... B05D 7/24
(52) U.S. Cl. ....................................... 427/380; 427/381
(58) Field of Search ................................. 427/379, 380, 427/381

(56) References Cited

U.S. PATENT DOCUMENTS

| | | | | |
|---|---|---|---|---|
| 4,325,930 A | * | 4/1982 | Vallet .......................... 423/345 |
| 4,576,836 A | * | 3/1986 | Colmet et al. ............... 427/255 |
| 4,737,328 A | * | 4/1988 | Morelock .................... 264/102 |
| 4,863,773 A | * | 9/1989 | Rousseau et al. ............. 428/68 |
| 5,020,357 A | * | 6/1991 | Kovacevic et al. .............. 73/1 |
| 5,238,568 A | * | 8/1993 | Fely et al. ................... 210/490 |
| 5,253,431 A | * | 10/1993 | Smith .......................... 33/810 |
| 5,269,067 A | * | 12/1993 | Waeldele et al. ............. 33/502 |
| 5,360,638 A | * | 11/1994 | Lequertier ................... 427/257 |
| 5,491,000 A | * | 2/1996 | Hocquellet et al. .......... 427/113 |
| 5,581,012 A | * | 12/1996 | Critelli ............................ 73/1 |
| 6,277,440 B1 | * | 8/2001 | Reynolds .................... 427/226 |

FOREIGN PATENT DOCUMENTS

| | | | |
|---|---|---|---|
| DD | 262275 | * | 11/1988 |
| DD | 290254 | * | 5/1991 |
| DD | 290255 | * | 5/1991 |
| DE | 3503779 | * | 8/1986 |
| DE | 3503804 | * | 8/1986 |
| DE | 4409377 | * | 9/1995 |
| DE | 19642506 | * | 10/1997 |
| DE | 19720883 | * | 11/1998 |
| DE | 19837768 | * | 3/2000 |
| EP | 336648 | * | 10/1989 |
| EP | 660073 | * | 6/1995 |
| IT | 0660073 | | 6/1995 |
| JP | 06-249767 | * | 9/1994 |
| JP | 6249767 | | 9/1994 |
| WO | WO 91/19953 | * | 12/1991 |

* cited by examiner

*Primary Examiner*—Erma Cameron
(74) *Attorney, Agent, or Firm*—Milde & Hoffberg, LLP

(57) ABSTRACT

A calibrating consists at least in part of a carbon fiber composite body. The composite body is formed from a porous material from a carbon-containing matrix, into which carbon fibers are embedded, this matrix is thickened by fluid infiltration of Si, which is essentially converted by reaction with carbon to SiC. The overall portion of Si and SIC is a maximum of 60% by volume. The carbon fibers have a minimum length of 3 mm.

21 Claims, 4 Drawing Sheets

CALIBRATING BODY

CROSS-REFERENCE TO RELATED APPLICATION

This application is a divisional application of U.S. patent application Ser. No. 09/769,172, filed Jan. 25, 2001, now abandoned.

BACKGROUND OF THE INVENTION

The present invention relates to a calibrating body which consists at least in part of a carbon fiber composite body.

The German Patent No. 19 642 506 C1 describes the manufacture of an article based on carbon fiber materials, carbides and/or DI carbides with great surface stability and great temperature stability. A carbon-based blank in the form of graphite or carbon fibers is infiltrated or impregnated by a mass of silicon, boron, copper, and one or more refractory metals. An oxygen-free reaction takes place to form, first of all, silicon carbide, and then boron carbide. Oxygen-free, the impregnated blank undergoes an increase in weight of 15–150%, at a temperature of 2190 to 2220 K, and a pressure of 60 to 400 Pa. Intermediate cooling takes place; and then a paste consisting of hafnium, boron, carbon and organic binders is applied to the surface of the blank. The blank is then completely dried, followed by heat treatment in silicon and a nitrogen atmosphere. Among other things, end-measuring rods and plug gauges can be produced from blanks thus manufactured.

Calibrating bodies are used in other areas of industry and research to perform spatial measurements of structures and components, or to adjust and calibrate measuring instruments and devices. Following initial setup, such measuring devices must be re-calibrated after repairs, and routinely after specified time intervals.

The calibration length is guided by the size of the unit to be measured, and can exceed 1000 mm. Additionally, calibrating bodies in a majority of applications must have stable shapes in the three spatial directions.

Calibrating bodies are configured as two-dimensional components, such as plates, or as three-dimensional bodies such as cubes or tetrahedrons. Such a three-dimensional testing body is known from the German Patent No. DE-A1 197 20 883. This testing body functions for monitoring of spatially positioned or measured systems, particularly of coordinate measurement devices. A special tetrahedron structure made of spheres and rods is described, with the rods made of carbon fiber composite material with fibers that are unidirectional in the longitudinal direction of the rod. The individual rods are connected to each other at nodal points at which the spheres are placed. Using such a device, large and stationary objects are to be measured; the rod-and-sphere design makes possible easy assembly and disassembly, and thus easy transport. The use, in one embodiment form of this test body, of carbon fiber rods with a longitudinal fiber orientation, ought to contribute toward lowered test body weight, great long-duration stability and thermal expansion coefficients tending toward zero. It is true, however, that the structure permitting disassembly results in considerable inadequacies regarding accuracy to gauge and reproducibility of it.

It has been shown that calibrating bodies that include components made of carbon fibers (carbon-fiber-reinforced plastics) possess disadvantageous properties of water accumulation, creep (by "creep" is meant a load-dependent (including intrinsic weight) deformation whose amount changes with time), swelling, and embrittlement, and thereby demonstrate a measurable geometric alteration. They thus of necessity yield measurement accuracies that are unacceptable for many instances of application.

Additionally, after repeated thermal loads, such calibrating bodies exhibit a peculiarity in that when the temperature loading has receded i.e., when the initial temperature has been reached, permanent geometric changes may appear. This permanent change resulting from temperature alternations is designated as geometrical hysteresis, and it means that calibrating bodies, for example, may not be giving constant measurements while used. Thus, it is not a given that these calibrating bodies will maintain accuracy to gauge during or between calibration measurements when there are temperature changes. Therefore, such calibrating bodies must be re-measured at regular intervals (intrinsic calibration), in order to continue to be used as a test body. Further examples of the state of the art that is generally concerned with calibrating bodies or true-to-mass parts, are to be found in the following patent publications: DE 44 09 377 A1, JP 6-249767 A, DE 35 03 804 A1, DE 35 03 779 A1, EP 0 660 073 A1, W091/19953 A1, DD 290 255 A5, DD 290 254 A5 and DD 262 275 A1.

SUMMARY OF THE INVENTION

Based on the state of the art described above, the task of the present invention is to produce a calibrating body which exhibits virtually no measurable geometrical hysteresis in a temperature range from −50° C. to +75° C., and thus possesses a long-duration accuracy to gauge, whereby the required number of intrinsic calibrations of such a calibrating body can be substantially reduced as compared to known calibrating bodies.

This object, as well as other objects which will become apparent from the discussion that follows, is achieved by a calibrating body that consists at least in part of a carbon fiber composite material, with the composite body consisting of a porous material made of a carbon-containing matrix into which the carbon fibers are embedded. This matrix is thickened through fluid filtration of Si, which essentially has been transformed into SiC by reaction with carbon. The overall portion of Si and SiC is a maximum of 60% by volume. The carbon fibers have a minimum length of 3 mm.

In such a test body, virtually no geometric alterations in shape are observed as a consequence of thermal loading. It can be determined that no thermally-caused hysteresis loops are produced in the required temperature range of −50° C. to +75° C., and, if there are any, length alteration is reversible via the temperature. Such calibrating bodies can be especially used in the service area of measuring device manufacture. They meet the requirement of a thermal expansion coefficient that satisfies the condition $-1 \times 10^{-5} \leq \alpha \leq +1 \times 10^{-8}$ [1/K], which has a small thermal capacity, which demonstrates high thermal conductivity, so that the time interval of acclimatization until reuse can be minimized. Additionally, such a test body is distinguished by its small, specific weight, in the area of $p=2.0$ g/cm$^3$. Also, the material reveals that atmospheric moisture does not affect it. Additionally, no tendency toward breakage owing to embrittlement is observed. Lastly, the invention-specific calibrating bodies have high rigidity, to preclude deformations through their intrinsic weight. Compared to customary calibrating bodies made, for example, of Invar, such invention-specific bodies can be manufactured at relatively favorable costs.

Virtually no measurable changes in length appeared upon heating in the required temperature range, through the above-indicated thermal expansion coefficient $_\alpha$. From this it can be gleaned that likewise when cooled, the bodies experience almost no change, and thereby also no hysteresis.

The portion of free Si in the composite body should be smaller than 10% by volume, and preferably smaller than 1% by volume. Consequently, care is to be taken that the Si incorporated into the carbon fiber body through fluid filtration be substantially converted into SiC by reaction with carbon, so that the least possible portion, if possible less than 1% by volume, of free Si remains. Such a small portion of free Si causes thermal stability to be enhanced.

Too high an Si portion, and also a high portion of SiC, also results in a decrease in component stability, and additionally in an increase in mass, and an alteration of the thermal expansion coefficient $_\alpha$ in the direction of excessively high elongations.

It is advantageous if invention-specific calibrating bodies can easily be made into an appropriate geometric shape, by, first of all, having a composite body in the geometric shape of the calibrating body manufactured from a porous material from a carbon-containing matrix, with carbon fibers embedded into the matrix. Next, liquid silicon is infiltrated, which then reacts with carbon to form SiC. The result is a highly densified body, with care needing to be taken that the overall portion of Si and SiC amounts to no more than 60% by volume. The carbon fibers should have a minimum length of 3 mm. Thermal expansion of carbon fibers in the temperature range between −50° C. and +75° C. is negative in terms of amount in its longitudinal extent. Therefore, carbon fibers can compensate for the behavior of Si and SiC, which is positive in terms of amount. Through this means, the expansion behavior of the composite body can be varied, and optimized at very small values overall. If fiber length is less than 3 mm, the result is increased reaction of fibers (larger surface) with the liquid silicon to form SiC, so that both the susceptibility to brittle fracture and the thermal expansion coefficient in the composite body increase markedly. It is additionally true that if the smallest length of fibers used is under 3 mm, their influence on the thermal expansion coefficient of the composite body is too little, with the result that the thermal expansion coefficient of the calibrating body assumes excessively high values that no longer are within the pre-set range.

Additionally, it is to be preferred that in the composite body, the matrix components have a grain size of 100 μm at most. This dimensional limitation of the matrix components ensures that the matrix components are present in the composite body in predominantly uniform fashion, and no local distortions can appear in the joints which could lead to hysteresis effects or to creep.

In regard to the open porosity of the composite body, preferably it should amount to <5% by volume. The result of this is that moisture is prevented from being absorbed, or kept at a low level.

Additionally, low porosity ensures that the calibrating body will have great stability, particularly in regard to mechanical loads as they appear in practice.

To adjust the expansion behavior of the composite body, additives can be introduced and distributed evenly; preferably these will be in powder form. Additives in the form of carbon powder or SiC powder in particular have proven themselves. Additives in the form of carbon powder can be used when lower fiber volume contents are aimed at. By this means two things are achieved: still-sufficient stabilities are achieved, and the overall portion of Si and SiC is limited to a maximum of 60% by volume. In contrast, additives in the form of SiC powder are to be preferred if uptake of liquid Si must be kept as low as possible where fiber volume contents are low, in order to avoid a reaction with the fibers and thus prevent brittle fracture.

The composite body preferably is configured from carbon fibers in the form of mats. By means of mats, the structure and stability of the composite body, and thus of the calibrating body, can be adjusted in defined fashion. Mats in woven and/or knitted form have proven themselves; it is preferred that the mats extend in the x- and y-directions. In the z-direction, they are piled on top of one another, with the x-, y- and z-directions forming a rectangular coordinate system. Further, in their structure and arrangement in the z-direction, the mats are to be placed symmetrical to a central plane. Additionally, a placement of mats with an orthotropic structure is preferred, since composite bodies may thus be manufactured in a simpler and thus cost-efficient manner without scrap waste of expensive carbon fibers.

With a quasi-isotropic structure, i.e., alternating layers in the z-direction which are turned in the x- and y-planes at directions of 45°, what can further be attained is that the anisotropic material behavior can approach isotropic behavior, so that the directional dependence in regard to strength and thermal expansion coefficient, particularly in plate-shaped calibration bodies, can be significantly reduced. Particularly in the fiber and weave planes, a very low a can be achieved.

In regard to the promoted properties of the calibrating body, generally in composite bodies, the fibers should be aligned in two-dimensional fashion.

It has been shown that the composite body or the calibrating body can have its interior stresses minimized before use by thermal aging. Such thermal aging should take place in a temperature range between +100° C. and −100° C., and with a cycle number between 1 and 5, i.e., the calibrating body is first heated and then cooled (corresponding to one cycle), so that it then will exhibit a long-term stability and a very low geometrical hysteresis.

A calibrating body optimized for the essential applications possesses a composite body with a carbon content of 76% by volume, a SiC content in the range of 17% by volume, a content of free Si of about 5% by volume, and an open porosity of about 2% by volume. With such a calibrating body, the following physical values are attained.

EMBODIMENT EXAMPLE 1:

Density ρ: 2.0 g/cm$^3$

Thermal expansion coefficient $_\alpha$ (measured in the temperature range −50° C.<T<+50° C.):

$$-0.1 \cdot 10^{-5} \cdot K^{-1} < \alpha < 0.2 \cdot 10^{-8} \cdot K^{-1}$$

Open porosity: 2% by volume

Bending strength: 132 MPa

One preferred application of such calibrating bodies is in the area of coordinate measuring machines; additionally they can be used as rulers, as angle measuring devices, as gauges, length gauges or end gauges. Such calibrating bodies are depicted in the figures of the appended drawings.

DESCRIPTION OF THE PREFERRED EMBODIMENTS

Figure 1:
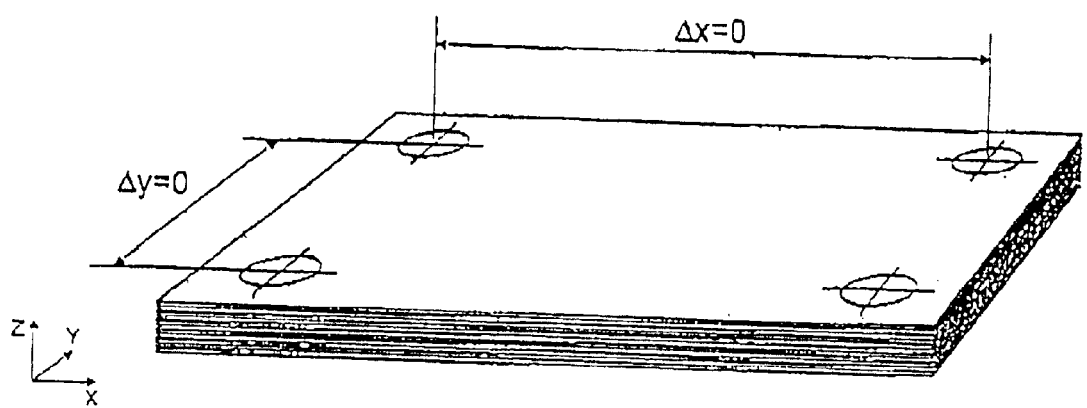
FIG. 1 is a schematically depicted calibration plate which is configured from individual carbon fiber mats in woven or knitted form, with four measurement locations close to the corners in the form of boreholes running in the y-direction.
Figure 2:
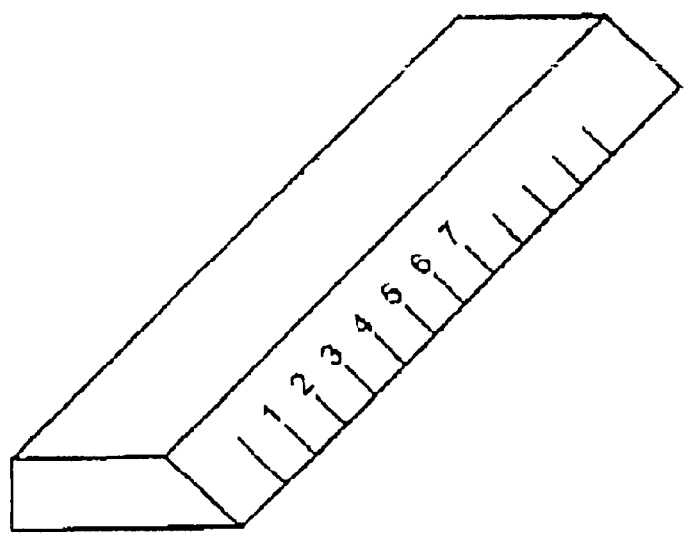
FIG. 2 is a calibrating body in the form of a ruler with a sloped lateral edge.
Figure 3:
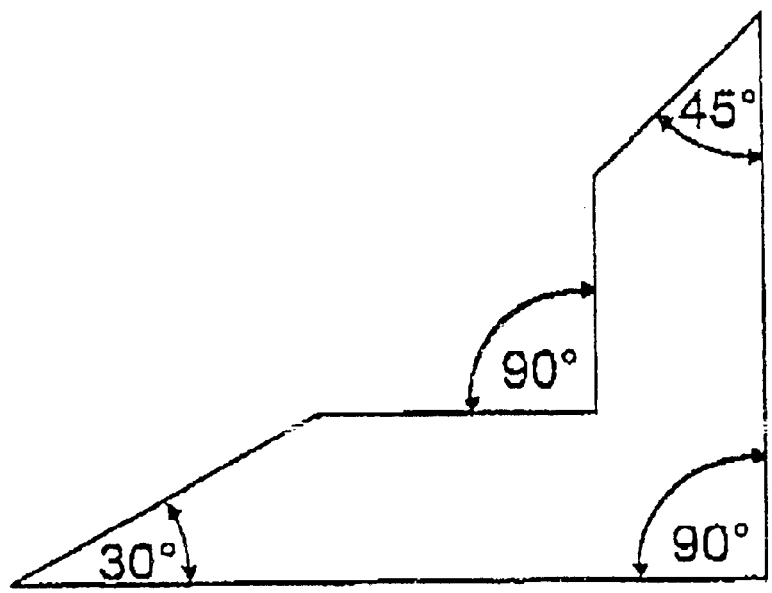
FIG. 3 is a calibrating body in the form of an angle-measuring instrument with two legs that meet at an angle of 90° to each other and are equipped at their ends with an edge running at 300 to 45°.
Figure 4:
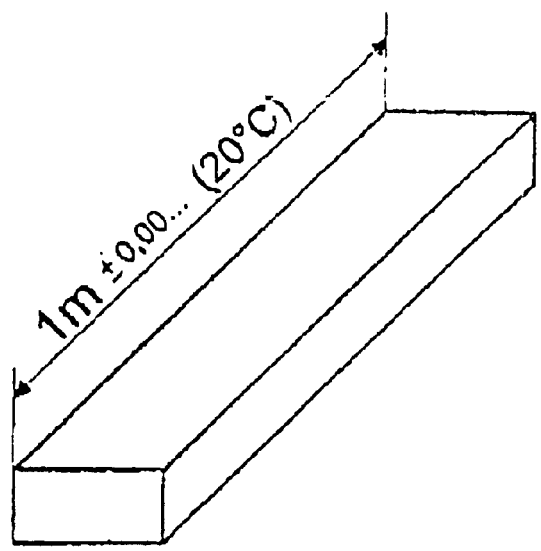
FIG. 4 is a calibrating body in the form of an end gauge with a length of 1 m.
Figure 5:
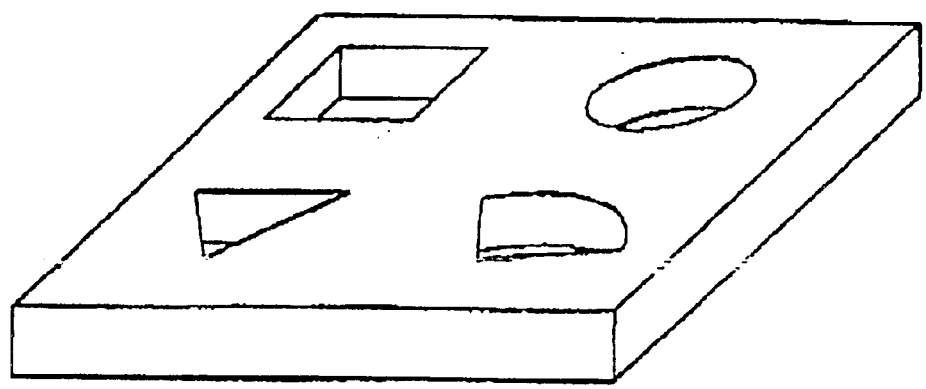
FIG. 5 is a standard or template with four openings of differing geometries.
Figure 6:
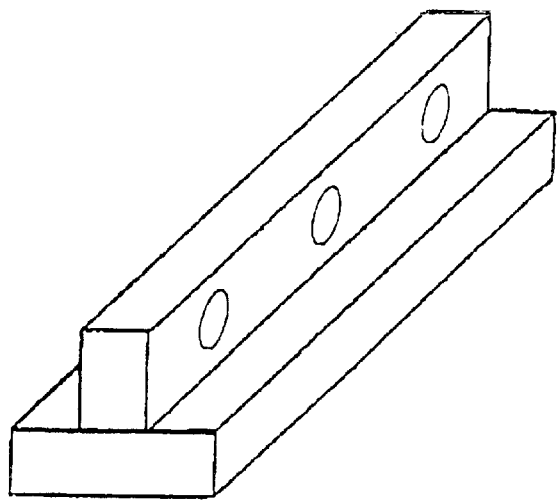
FIG. 6 is a one-dimensional coordinate measuring device that is composed of two plate-shaped or bar-shaped calibration bodies, arrayed so as to produce a T-shaped cross section, with three boreholes on the vertical placed bar.
Figure 7:
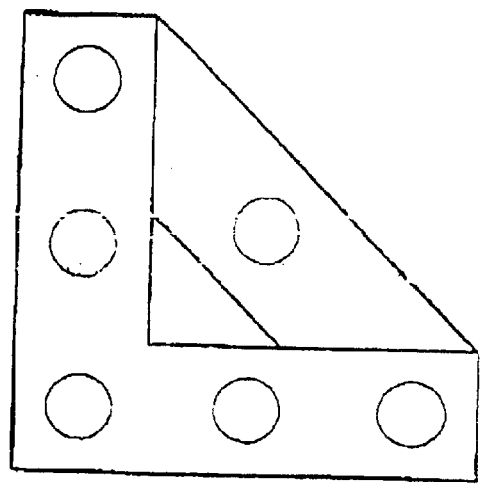
FIG. 7 is a two-dimensional coordinate measure which consists of an angle and a diagonal piece that connects the ends of the angle, with boreholes made both in the angle and in the diagonal piece.
Figure 8:
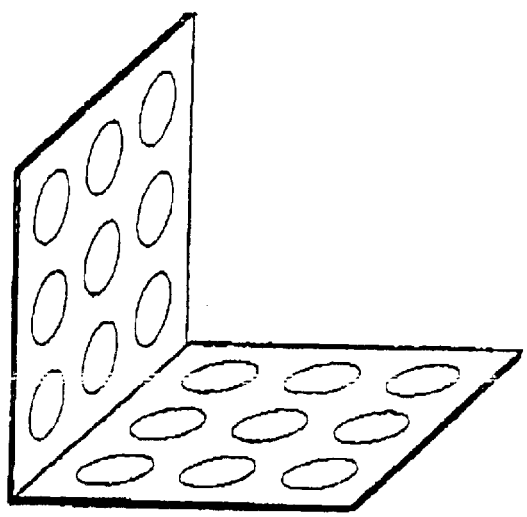
FIG. 8 is a three-dimensional coordinate measure that consists of two thin plates meeting each other at a 90° angle, with each plate exhibiting a field of 3×3 boreholes.

As a rule, calibrating bodies have simple two- or three-dimensional geometries as depicted in the figures, which exhibit the revealed measurement locations (surfaces, edges, corners, boreholes). These locations have available surfaces of very high quality—ground or polished—to ensure that measurements can be reproduced. To this end, geometrically precise shapes made of such materials as monolithic ceramics or metal can also be incorporated into or attached to calibrating bodies by gluing, for instance.

Reference can be made to the relevant DIN (German Industry Standard) standards for the configuration and layout of such calibrating bodies. There is a requirement for a calibration length to be as long as possible which can be measured without shifting the calibrating body, and also a requirement for low weight. To optimize between these two requirements, the invention-specific calibration body is produced with dimensions of not more than 1200 mm.

In order to assemble more complex calibrating bodies, individual calibration body parts can be pre-manufactured and fit together in situ by joints.

It is customary, prior to using calibrating bodies, to measure and calibrate them at considerable expense at a specific temperature such as 20° C. After a thermal loading in the temperature range mentioned, and then subsequent reduction to the calibration temperature, the difference between previously determined points must then be reestablished exactly and simultaneously. This corresponds to the requirement that after no matter how many loading cycles, the starting point must match the end point, and thus no hysteresis loops may be present.

Further reasons for appearance of hysteresis in calibrating bodies according to the state of the art are transformation of crystal structures, further reactions of chemical elements of the materials, and settling motions in structures of the material. In the invention-specific calibrating body made of carbon-fiber-reinforced composite material that is impregnated by liquid silicon, which predominantly reacts with carbon to make SiC, these critical points do not exist. A possible settling of the material can be taken into account, as already mentioned above, by the fact that prior to use as a calibrating body, aging takes place. For this, in trials, calibrating bodies were heated up to five times in an oven to 100° C., each maintained for 2 hours at this temperature, and then cooled to at least −60° C. in a cooling chamber, with a dwell time again of 2 hours.

For purposes of a trial, calibrating bodies were manufactured. These were calibrating plates corresponding to one such that is depicted schematically in FIG. 1, with individual carbon fiber mats in woven or knitted form, extending in the x-y directions. The individual mats are stacked on top of one another in the z-direction in the requisite number to attain the required calibrating plate thickness. Additionally, boreholes were made into the calibrating plate in the z-direction. High-precision measurement sheaths made of metal were inserted into these boreholes in order to realize smooth and low-abrasion reference surfaces for determination of the measured points (mid-points of the measurement sheaths).

A calibrating body as is shown, for example, in FIG. 1, is fabricated as follows:

EMBODIMENT EXAMPLE 2:

Initial materials were:
fibers: HTA, Tenax; Manufacturer, AKZO;
Fabrics: ST462 (i.e., Weave: double-milled twill 2/2, surface weight 245 g/m². Number of filaments: 3000)

Of the fabric, 28 layers were stacked on top of each other in the z-direction with an orientation of fiber directions within the layers of 0°/90°.

The carbon fiber composite body thus produced was treated in an autoclave at a maximum temperature $T_{max}$= 210° C., and a maximum pressure $P_{max}$=8 bar (8×10⁵ Pa) for a duration of 90 minutes.

The carbon fiber raw body produced by this autoclaving process had a weight of 2787 g, a volume of 1875 cm³, and a fiber volume content of about 52%.

This carbon fiber composite body was then coked in a subsequent pyrolysis step at $T_{max}$=1650° C. and $P_{max}$=1.1 bar (1.1×10⁵ Pa) into a C/C input body, i.e., the matrix plastic of the carbon-fiber composite was transformed into carbon with the volatile components released. Owing to the release of volatile components, a volume shrinkage took place, particularly in the thickness direction, since in the fiber direction, the fibers exert a bracing effect in regard to the geometry. The shrinkage resulted in a volume of 1641.7 cm³. From this a fiber volume content of 57.5% is computed, with a weight of 2236 g.

The C/C input body was infiltrated by liquid silicon in a third process step at $T_{max}$=1650° C. and P=10⁻³ bar (10² Pa). This caused the weight to increase to 3015 g with a volume of 1674 cm³ and a fiber volume content of about 58.5%.

The parameters and values of the individual stages can be gleaned from the following table:

|  | CFC | C/C | C/C - SiC |
|---|---|---|---|
| Fiber volume content | ~52% | 57.5% (evaluated based on CFC) | 58.5% (evaluated based on CFC) |
| $T_{max}$ | 210° C. | 1650° C. | 1650° C. |
| $P_{max}$ | 8 bar | 1.1 bar | 10⁻³ bar |
| Mass | 2787 g | 2236 g | 3015 g |
| Volume | 500 × 500 × 7.5 mm³ | 499 × 499 × 6.7 mm³ | 498 × 498 × 6.75 mm³ |

The Archimedes method yielded an experimental density in C/C—SiC of 1.8 g/cm³ and an experimental, open porosity in CIC—SiC of 3.3% by volume.

With a calibrating body thus manufactured, initial measurements were carried out which yielded the following measurement data:

Thermal expansion coefficient:

$$-0.4 \cdot 10^{-4} \cdot K^{-1} < \alpha < 0.1 \cdot 10^{-6} \cdot K^{-1} \text{ at } -60° \text{ C.} < T < 100° \text{ C.}$$

With 8 measurements, each after a thermal cycling in the oven or in the cooling chamber (prior to each measurement, heating took place to 100° C., cooling to −60° C., and a temperature adjustment to about 20° C.), the result was no hysteresis and no measurable residual geometrical alterations. In other words, two points determined beforehand were reproduced again after thermal cycling and return to the initial temperature, at the same geometric locations as before thermal cycling. The measurement uncertainty of the Zeiss Company device used was 1.5 μm+3 μm is present in space (i.e., on the first measured meter, a maximum inaccuracy of 1.5 μm is present in space; with each following meter, 3 μm is added to the 1.5 μm).

It is evident from these measured data that the required and new requirements in regard to hysteresis, materials aging, weight, handling capacity, physical qualities and price are met and exceeded.

There has thus been shown and described a novel calibrating body which fulfills all the objects and advantages sought therefor. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention, which is to which follow.

What is claimed is:

1. A method of producing a calibrating body, said method comprising the steps of:
   a) forming a carbon fiber composite body in a desired shape from a porous material from a carbon-containing matrix, into which carbon fibers are embedded; and
   b) densifying the composite body by liquid-infiltration of Si, which is essentially converted by reaction with carbon to SiC, wherein the overall portion of Si and SiC is a maximum of 60% by volume, and wherein the carbon fibers have a minimum length of 3 mm.

2. Method according to claim 1, wherein in the densified composite body the portion of free Si is <10% by volume.

3. Method according to claim 2, wherein in the densified composite body the portion of free Si is <1% by volume.

4. Method according to claim 1, wherein in the composite body the matrix components have a maximum grain size of 100 μm.

5. Method according to claim 1, wherein the open porosity of the densified composite body is <5% by volume.

6. Method according to claim 1, wherein the composite body contains evenly distributed additives for adjusting the elongation behavior.

7. Method according to claim 6, wherein the additives are in powder form.

8. Method according to claim 7, wherein the additives are carbon powder.

9. Method according to claim 7, wherein the additives are SiC powder.

10. Method according to claim 1, wherein in the composite body the carbon fibers are in the form of mats.

11. Method according to claim 10, wherein the mats are in a form selected from the group consisting of woven and knitted.

12. Method according to claim 10, wherein the mats extend in the x-y plane directions, and are stacked on top of one another in the z-direction, with the x-, y- and z-directions forming a rectangular coordinate system.

13. Method according to claim 12, wherein the mats in their structure and layout in the z-direction are placed symmetric to a central plane.

14. Method according to claim 13, wherein the mat placement exhibits an orthotropic structure.

15. Method according to claim 10, wherein the mats are arranged in a quasi-isotropic structure.

16. Method according to claim 1, wherein in the composite body, the fibers are arrayed two-dimensionally.

17. Method according to claim 1, further comprising the step of thermally aging the densified composite body to reduce its internal stress.

18. Method according to claim 17, wherein the thermal aging takes place in a temperature range between +100° C. and −100° C.

19. Method according to claim 17, wherein the thermal aging is done in a number of cycles between 1 and 5.

20. Method according to claim 1, wherein the densified composite body exhibits a carbon content of 76% by volume, an SiC content of about 17% by volume, a free Si content of about 5% by volume, and an open porosity of about 2% by volume.

21. Method according to claim 1, further comprising the step of forming the calibrating body as a calibrating instrument selected from the group consisting of an end gauge, a precision gauge block, a standard measure, a standard of length, a linear measurement device, a straightedge, a ruler, an angle measuring device and a coordinate measuring device.

* * * * *